United States Patent

[11] 3,540,747

| [72] | Inventors | Bo Gustav Stjernstrom<br>Tyreso;<br>Tord Roger Svensson, Stockholm, Sweden |
|---|---|---|
| [21] | Appl. No. | 867,419 |
| [22] | Filed | Oct. 17, 1969<br>Continuation of Ser. No. 640,218,<br>May 22, 1967, abandoned. |
| [45] | Patented | Nov. 17, 1970 |
| [73] | Assignee | Stenberg-Flygt AB<br>Solna, Sweden<br>a corporation of Sweden |
| [32] | Priority | June 3, 1966 |
| [33] | | Sweden |
| [31] | | No. 7695/66 |

[54] SEALING MEMBER
1 Claim, 8 Drawing Figs.

[52] U.S. Cl............................................. 277/211,
277/166, 277/208, 285/192, 49/484, 49/495
[51] Int. Cl........................................F16k 41/00,
B65d 53/00, F16j 15/00

[50] Field of Search......................................... 277/211,
208, 209, 166; 285/192; 49/484, 485, 500, 479,
495

[56] References Cited
UNITED STATES PATENTS

| 767,763 | 8/1904 | Reinvaldt...................... | 277/211X |
| 2,191,044 | 2/1940 | Seligman...................... | 277/235X |
| 2,560,308 | 7/1951 | Spraragen..................... | 49/495X |
| 2,705,655 | 4/1955 | Brown et al................... | 277/166X |

Primary Examiner—Samuel Rothberg
Attorney—Sughrue, Rothwell, Mion, Zinn & MacPeak ABSTRACT: A self-locking gasket of resilient material is constituted by two bead-shaped outer parts extending alongside each other and connected by a narrower intermediate part, the thickness of which is smaller than that of the outer parts.

Patented Nov. 17, 1970

SEALING MEMBER

The present invention relates to a sealing member of a resilient material such as rubber, particularly intended for elastic statical sealings.

For efficiently sealing joints against gases and liquids elastic gaskets are often required, particularly when the sealing surfaces do not exactly fit each other. For static sealings one usually uses a gasket which does not have the same shape as the gap it is to fill, the sealing effect being achieved in that the gasket is distorted by being subjected to a pressure, so that said gasket will engage the walls of the gap. The type of gasket used to an increasing extent for such purpose is a so called O-ring gasket. In order to achieve a sealing, the O-ring gasket must, however, be inserted into a rectangular groove provided in one of the elements between which the sealing is to be achieved. This implies that gaskets of O-ring type cannot be used for the sealing between a thin wall and a through-going pipe, for instance. The O-ring type gasket must be inserted into a groove provided in the passage opening in the wall. This implies often an excessive wall thickness. In the case of a pipe diameter of 50 mm. for instance, an 0-ring gasket according to standards will have a thickness of about 6 mm. This implies that the wall must have a thickness of at least 10 mm. if the 0-ring gasket is to be inserted into a groove provided in the wall opening. In order to make it possible to reduce the wall thickness one has hitherto been obliged to provide the wall opening with a larger flange or the like in which a groove for the 0-ring is provided. All these solutions are, of course, costly and increase the weight of the structure.

0-rings have the further drawback that at higher pressures they have a tendency to be extruded from the gap between both parts of a joint. One is therefor often compelled to insert protective rings of leather, plastic or similar material in the groove in order to prevent the extrusion of the 0-ring.

Due to the small sealing surface, 0-rings also require well machined sealing surfaces on both parts of the joint, since there would otherwise be a risk of poor sealing when the joints parts are not strictly aligned.

The present invention has for its object to overcome the above drawbacks and relates to a sealing member of resilient material which is essentially characterized in that said member is constituted by two preferably identical, substantially bead-shaped outer parts extending alongside each other and connected by a narrower intermediate part, the minimum thickness of which is smaller than the thickness of any of the outer parts.

The sealing member according to the invention, called twin gasket in the following, is a very useful structure member and achieves, for instance, a very good sealing between a hole in a very thin wall and a through-going pipe. The twin gasket further provides sealing against inner and outer overpressure due to wedge action and it is thus self-sealing and self-locking, that is to say, the higher the pressure, the better the sealing efficiency. The twin gasket according to the invention does not require any groove in any of the parts of the joint and allows both radial and axial displacement as well as a lack of alignment of the joint parts in relation to each other without the sealing effect being impaired.

The twin gasket according to the invention further provides a good sealing action between very coarse surfaces due to its comparatively large engagement surface.

According to an embodiment of the invention the bead-shaped outer parts of the twin gasket of the invention have substantially a circular shape and form a sealing ring, the cross section of the circular parts being symmetric in relation to a plane perpendicular to the axis of the sealing ring. This embodiment is particularly well suited for providing a sealing between the edges of a hole in a thin wall and a through-going pipe. According to another embodiment of the invention both circular outer parts and the intermediate part are extending along a plane perpendicular to the axis of the sealing ring. Said embodiment is particularly well suited for providing a sealing at both ends of a thin-walled cylinder clamped between two plane surfaces. According to a further embodiment of the invention the twin gasket may be strip shaped. For providing sealing between two flanged connections or two flat surfaces through-going holes for the connection bolts or the like can be provided in spaced relationship in the narrower intermediate part of the sealing member. In order to prevent both bead-shaped outer parts of the sealing member from being pulled apart under the action of high stresses, one or several reinforcement members of for instance glass fiber, wire gauze or the like may be provided inside the sealing member.

The invention will be more particularly described hereinafter with reference to the accompanying drawings, in which.

Figure 1:
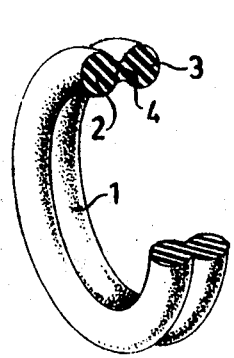
FIG. 1 is a perspective view of a sealing ring according to the invention, with portions broken away to show the section of the ring.

In FIG. 1 the sealing ring 1 is constituted by two bead-shaped outer parts 2, 3, respectively, extending alongside each other and having substantially a circular section, said outer parts being united by a narrower intermediate part 4. As is shown in FIG. 1, both bead-shaped outer parts are adjacent to each other along the axis of the sealing ring and have the same diameter.

Figure 2:
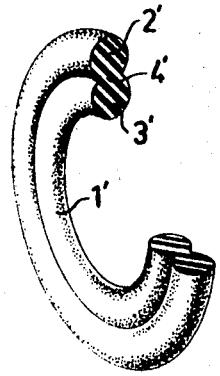
FIG. 2 is another embodiment of the sealing ring according to the invention with portions broken away to show the section of the ring.

FIG. 2 shows a sealing ring 1' with two bead-shaped outer parts 2', 3', respectively, extending alongside each other and connected by a narrower intermediate part 4'. The two bead-shaped outer parts are concentric and coplanar in relation to each other, the bead 2' being at the outside of the sealing ring and the bead 3' at the inside.

Figure 3:
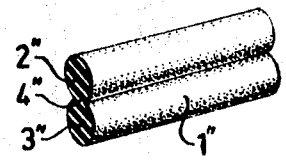
FIG. 3 is a perspective view of a part of a sealing strip according to the invention.

FIG. 3 shows a portion of a sealing strip 1" comprising two bead-shaped outer parts 2", 3", respectively, extending alongside each other and united by a narrower intermediate part 4".

Figure 4:
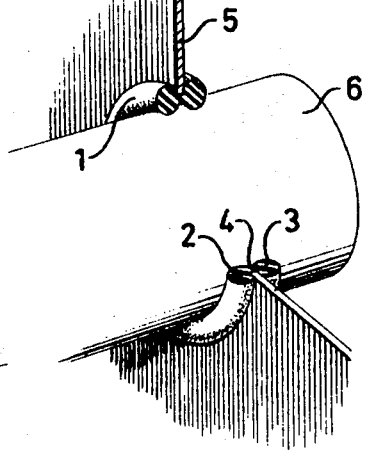
FIG. 4 is a sealing ring according to FIG. 1 inserted into a hole between a thin wall and a through-going pipe.

In FIG. 4 the sealing between the hole edges in a thin wall 5 and a through-going pipe 6 is achieved by means of a sealing ring 1. When assembling this structure the sealing ring is first introduced into the hole of the wall 5 so that the narrower intermediate part 4 of the sealing ring engages the hole edge, the bead-shaped outer parts 2 and 3 being located on each side of the wall 5. The pipe 6 thereafter is pushed in through the sealing ring 1. Sealing action is provided as described below with reference to FIG. 7.

Figure 5:
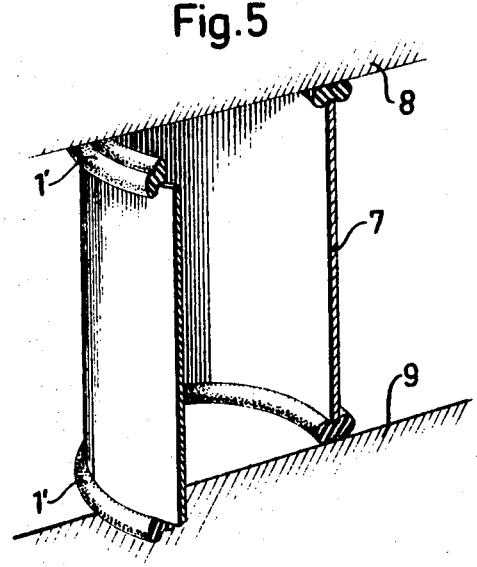
FIG. 5 shows two sealing rings according to FIG. 2 arranged so as to seal a cylinder clamped between two flat surfaces.

In FIG. 5 a thin-walled cylinder 7 is sealed against two flat surfaces 8, 9 by means of sealing rings 1', one at each end of the cylinder. When assembling the structure the rings 1' are first mounted on the cylinder ends so that the narrower intermediate part of the sealing rings engages the cylinder end edges whereupon the surfaces 8, 9 are pressed against the cylinder ends.

Figure 6:
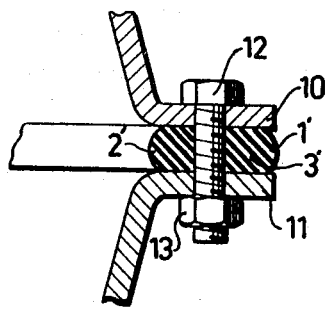
FIG. 6 is a modification of the sealing ring according to FIG. 2 clamped between a flanged connection.

FIG. 6 shows how a sealing ring 1' of the type shown in FIG. 2 is used for providing a sealing between two flanges 10 and 11, holes being provided in spaced relationship in the intermediate part 4' of the ring for the passage of the flange bolts 12. When the flange nuts 13 are tightened, the bead-shaped outer part 2' and 3' of the sealing ring are compressed and provide the sealing action in a manner known per se.

Figure 7:
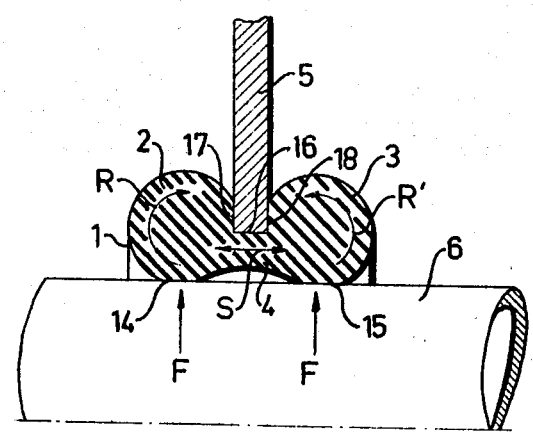
FIG. 7 shows schematically the forces developing in a twin gasket according to the invention fitted as shown in FIG. 4 or 5.

FIG. 7 shows in principle how a sealing ring according to the invention provides the sealing action in a structure of the type shown in FIG. 4. The sealing ring 1 has been placed against the edges of a hole 16 in a wall 5 as shown in FIG. 4. When a pipe 6 is pressed into the sealing ring, forces arise which all strive to provide a sealing between the pipe and the wall. The sealing engages the pipe 6 at the points 14 and 15 where the pipe exerts a pressure against the gasket as shown by the arrows F, F', respectively, in FIG. 7. Since the upward movements of the sealing ring in FIG. 7 is limited by the hole edge 16 in the wall 5 the beads 2 and 3 are rolled up along both sides of the wall 5 with a motion illustrated by the arrows R, R', respectively, on the drawing. The beads are thus brought to engagement against the wall 5 at 17, 18, respectively, on both sides of the hole 16. The intermediate part 4 is thus subjected to a strain so that tractive forces arise in the intermediate part 4 which are shown by the arrows S in FIG. 7. The tractive forces determine the force, with which the beads abut the wall 5 at 17 and 18 and depend of the intensity of the forces F and F', that is to say, the radial pressure of the pipe 6 against the sealing ring. Assuming that an overpressure arises to the left of the wall 5 in FIG. 7, this pressure will strive to extrude the gasket 1 through the gap between the hole 16 in the wall 5 and the pipe 6. Since the thickness of the bead 2 is considerably greater than the gap between the hole 16 in the wall 5 and the pipe 6, there occurs a wedge action, that is to say, the bead 2 is pressed against the wall 5 at 17 and against the pipe 6 at 14 with an abutting pressure increasing with the overpressure to the left of the wall in FIG. 7.

Figure 8:
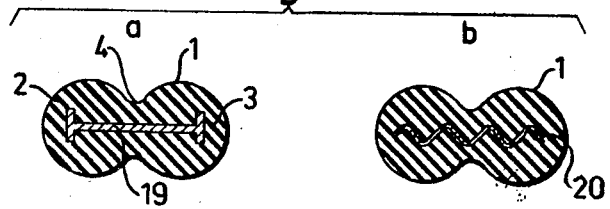
FIG. 8 shows two reinforcement possibilities of the twin gasket according to the invention.

Since the tractive forces S in the intermediate part 4 of the sealing ring FIG. 7 may become considerable under certain conditions, it may be preferably to provide the sealing ring with a reinforcement. FIG. 8 shows two embodiments of the invention with a reinforcement provided in the sealing ring. In FIG. 8a the reinforcement 19 is assumed to be constituted by a flexible but unextensible material, such as a cord ply or metallic gauze, firmly anchored in both bead-shaped outer parts 2 and 3. FIG. 8b shows a sealing ring 1 provided with a reinforcement 20 of flexible material, the corrugated form of the reinforcement allowing a certain elongation.

Although the invention has been described in connection with embodiments shown on the drawing, it is obvious that many alterations or modifications may be made within the scope of the appending claims.

We claim:

1. A sealing member of resilient material for providing a seal between two wall members extending perpendicular to each other, comprising: two identical, bead-shaped outer parts with circular cross sections of the same radius extending parallel to and substantially contiguous to each other and connected by a narrow intermediate part, the minimum thickness of the intermediate part being equal to the radius of the section thickness of any of the outer parts, and reinforcement means extending through the intermediate part and terminating in the outer parts to prevent the wall member that is received on the intermediate part from pulling apart the outer parts as said outer parts are rolled into tight sealing engagement with the opposite side of said wall member during assembly of said sealing member between said wall members.